United States Patent
Byrne et al.

(10) Patent No.: US 8,494,139 B2
(45) Date of Patent: **\*Jul. 23, 2013**

(54) SYSTEM FOR EMBEDDING PROGRAMMING LANGUAGE CONTENT IN XML

(75) Inventors: William J. Byrne, Sunnyvale, CA (US); Mitsuru Oshima, Cupertino, CA (US); Michael Achenbach, Los Altos, CA (US); Beth A. Bottos, San Jose, CA (US); Dai Zhu, San Jose, CA (US)

(73) Assignee: Intellectual Ventures I LLC, Wilmington, DC (US)

( * ) Notice: Subject to any disclaimer, the term of this patent is extended or adjusted under 35 U.S.C. 154(b) by 1511 days.

This patent is subject to a terminal disclaimer.

(21) Appl. No.: 11/511,211

(22) Filed: Aug. 29, 2006

(65) Prior Publication Data

US 2007/0116202 A1    May 24, 2007

Related U.S. Application Data

(63) Continuation of application No. 09/733,848, filed on Dec. 8, 2000, now Pat. No. 7,170,979.

(51) Int. Cl.
*H04M 3/42* (2006.01)

(52) U.S. Cl.
USPC .................................. 379/201.03; 379/88.18

(58) Field of Classification Search
USPC .......................................... 379/201.03, 88.18
See application file for complete search history.

(56) References Cited

U.S. PATENT DOCUMENTS

| | | | |
|---|---|---|---|
| 5,309,413 A * | 5/1994 | Chan ............................... | 368/63 |
| 5,864,605 A | 1/1999 | Keshav | |
| 5,943,401 A | 8/1999 | Risner et al. | |
| 6,144,938 A | 11/2000 | Surace et al. | |
| 6,240,391 B1 | 5/2001 | Ball et al. | |
| 6,263,051 B1 | 7/2001 | Saylor et al. | |
| 6,269,336 B1 | 7/2001 | Ladd et al. | |
| 6,363,411 B1 | 3/2002 | Dugan et al. | |
| 6,385,583 B1 | 5/2002 | Ladd et al. | |
| 6,463,461 B1 | 10/2002 | Hanson et al. | |
| 6,490,564 B1 | 12/2002 | Dodrill et al. | |
| 6,496,812 B1 | 12/2002 | Campaigne et al. | |
| 6,510,417 B1 | 1/2003 | Woods et al. | |
| 6,569,207 B1 | 5/2003 | Sundaresan | |
| 6,768,788 B1 | 7/2004 | Langseth et al. | |
| 7,016,847 B1 | 3/2006 | Tessel et al. | |
| 7,487,440 B2 * | 2/2009 | Gergic et al. ................. | 715/234 |
| 2002/0010736 A1 | 1/2002 | Marques et al. | |
| 2002/0019828 A1 | 2/2002 | Mortl | |
| 2002/0198719 A1 | 12/2002 | Gergic et al. | |

OTHER PUBLICATIONS

Voice eXtensible Markup Language, VoiceXML Version 1.00, Mar. 7, 2000, by VoiceXML Forum.

Maes, S, Modular DOM Based Multi-modal Browser Architecture Recommendation for Mobile e-Business and evolution to Conversational Computing, IBM T.J. Watson Center, pp. 1-45, Nov. 2000.

* cited by examiner

*Primary Examiner* — Simon Sing
(74) *Attorney, Agent, or Firm* — Sterne, Kessler, Goldstein & Fox P.L.L.C.

(57) ABSTRACT

A method for providing an interactive voice response service is provided. The method uses a VoiceXML interpreter in cooperation with a voice/audio application. The voice/audio application uses scripts coded in VoiceXML with embedded Java Server Pages (JSP). The use of VoiceXML along with JSP allows the present invention to provide an implementation that minimizes interaction between the voice/audio application and the VoiceXML server.

25 Claims, 2 Drawing Sheets

SYSTEM FOR EMBEDDING PROGRAMMING LANGUAGE CONTENT IN XML

CROSS-REFERENCE TO RELATED APPLICATIONS

The present application is a continuation of U.S. patent application Ser. No. 09/733,848 filed Dec. 8, 2000, which is incorporated herein by reference in its entirety.

This application is related to and incorporates by reference herein in its entirety the commonly owned patent application, concurrently filed with U.S. patent application Ser. No. 09/733,848, bearing U.S. patent application Ser. No. 09/732,812, now issued U.S. Pat. No. 7,016,847 entitled "OPEN ARCHITECTURE FOR A VOICE USER INTERFACE" by Mitsuru Oshima.

BACKGROUND OF THE INVENTION

Interactive voice response services are an increasingly common part of everyday life. Services of this type are used to provide everything from banking and credit card information to interactive driving systems. Interactive voice response services are also an increasingly popular way to access the World Wide Web. This is true in spite of the growing popularity of personal data assistants and web enabled cellular telephones. The nearly ubiquitous availability of telephones, and the ability to use voice in non-traditional environments (such as when driving) ensures that the popularity and diversity of interactive voice response services will continue to grow.

Voice eXtensible Markup Language (VoiceXML) is a response to the increasing use of interactive voice response services. VoiceXML is a language for scripting interactive voice response services.

As an example, consider the following VoiceXML fragment:

```
<vxml>
    <form>
        <block>
            <prompt>
                Hello, World!
            </prompt>
        </block>
    </form>
</vxml>
```

When processed by a VoiceXML interpreter, the prompt portion of the script plays text-to-speech (TTS) "Hello, World!"

VoiceXML fragments of this type have proven to be a flexible mechanism for accomplishing many tasks. At the same time, there are important cases where VoiceXML is lacking in required flexibility. Consider, for example, the case of an interactive voice response email service. Designers of this type of service might wish to generate a prompt that welcomes each user by name and tells them how many emails they have received since their last visit (e.g., "Hello Mr. Smith, you have ten new emails."). Unfortunately, this type of prompt requires dynamic generation—it includes fields that must be changed to match each user and each number of new emails.

In fact, the non-dynamic nature of VoiceXML contributes to a range of implementation difficulties. These difficulties become more severe (in most cases) in more complex VoiceXML applications. As a result, there is a need for systems that include dynamic content in VoiceXML and similar languages. This need is particularly important for complex interactive voice response services.

SUMMARY OF THE INVENTION

An embodiment of the present invention provides a method for providing an interactive voice response service. The method uses a VoiceXML interpreter in cooperation with a voice/audio application. The voice/audio application uses scripts coded in VoiceXML with embedded Java Server Pages (JSP). The use of VoiceXML along with JSP allows the present invention to provide an implementation that minimizes interaction between the voice/audio application and the VoiceXML server.

In one embodiment, the invention relates to a method for providing an interactive voice response service includes the steps of: creating a pool of audio prompts, subdividing the pool into segments, generating code to randomly select prompts from one of the segments, and sending the generated code to a VoiceXML interpreter.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 3:
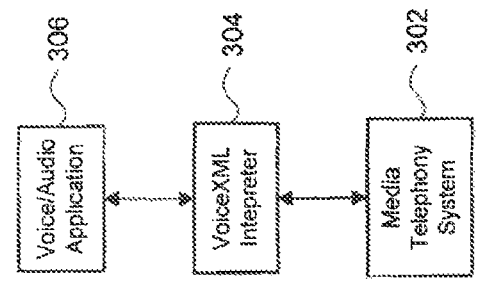
FIG. 3 is a block diagram showing a set of software components deployed in the network of FIG. 1.
Figure 1:
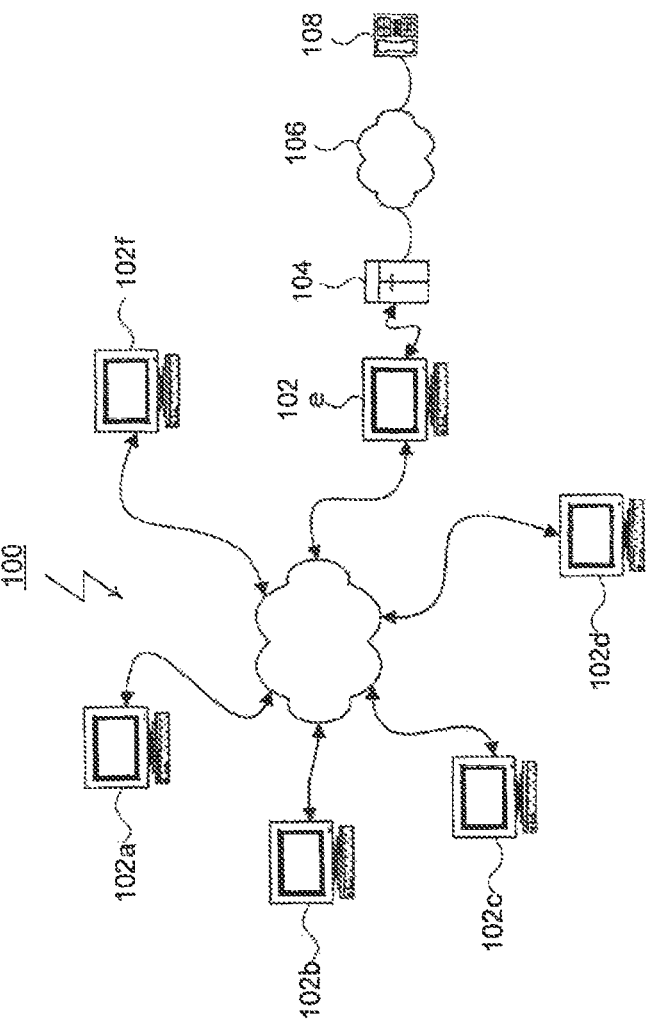
FIG. 1 is a block diagram of a computer network shown as a representative environment for an embodiment of the present invention.
Figure 2:
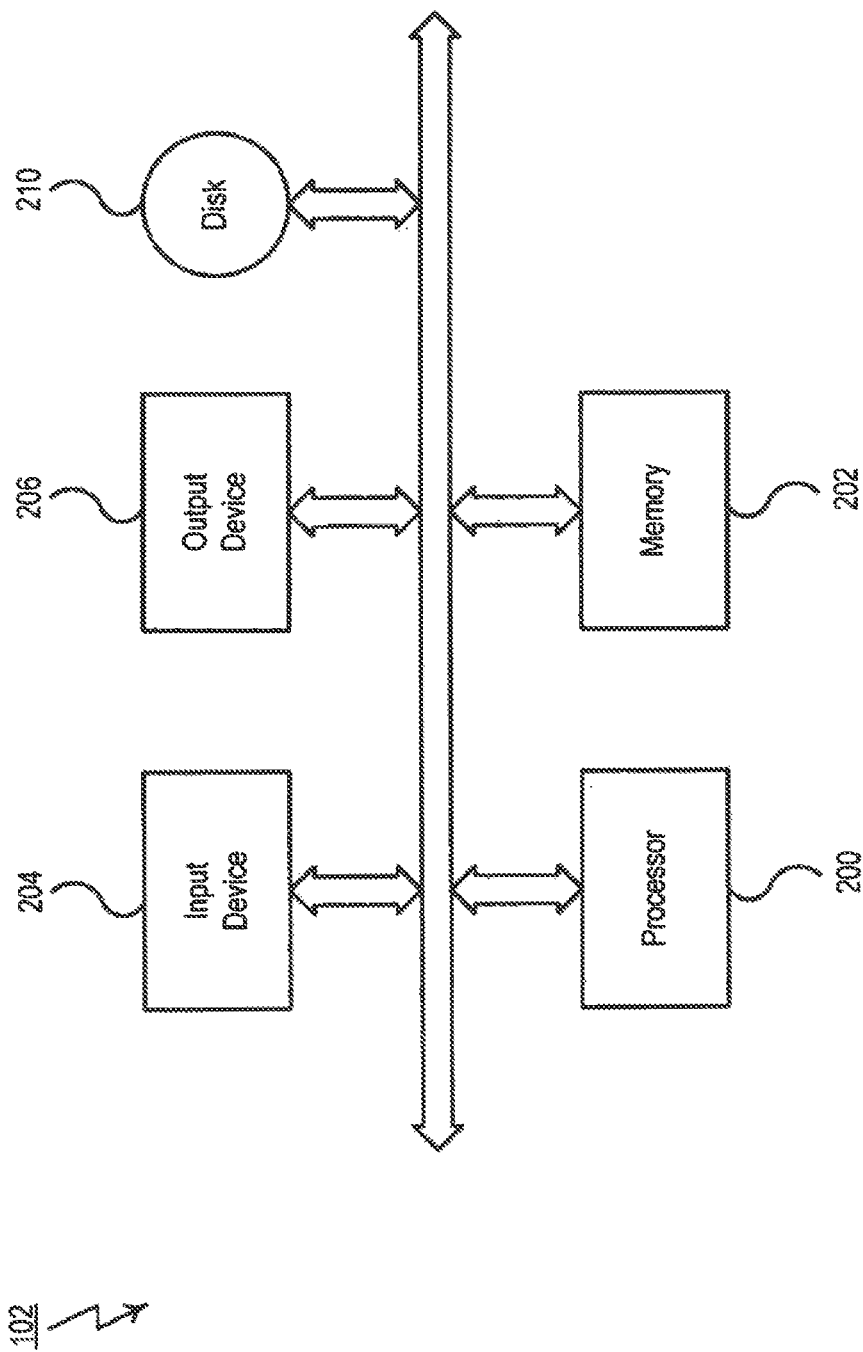
FIG. 2 is a block diagram of a computer system as may be used in the network of FIG. 1.

The preferred embodiments of the present invention and their advantages are best understood by referring to FIGS. 1 through 3 of the drawings. Like numerals are used for like and corresponding parts of the various drawings.

Environment

In FIG. 1, a computer network 100 is shown as a representative environment for an embodiment of the present invention. Computer network 100 is intended to be representative of the complete spectrum of computer network types including Internet and Internet-like networks. Computer network 100 includes a number of computer systems, of which computer system 102a through 102f are representative. Computer systems 102 are intended to be representative of the wide range of large and small computer and computer-like devices that are used in computer networks of all types. Computer systems 102 are specifically intended to include non-traditional computing devices such as personal digital assistants and web-enabled cellular telephones.

FIG. 2 shows a representative implementation for computer systems 102. Structurally, each computer system 102 includes a processor, or processors 200, and a memory 202. Processor 200 can be selected from a wide range of commercially available or custom types. An input device 204 and an output device 206 are connected to processor 200 and memory 202. Input device 204 and output device 206 represent all types of I/O devices such as disk drives, keyboards, modems, network adapters, printers and displays. Each computer system 102 may also include a disk drive 210 of any suitable disk drive type (equivalently, disk drive 210 may be any non-volatile mass storage system such as "flash" memory).

Computer network 100 also includes a telephony subsystem 104. Telephony subsystem 104 may be implemented as a separate system (as shown in FIG. 1) or, more typically, as a card included in one of computer systems 102. In either case, telephony subsystem 104 is connected to receive commands and data from computer system 102e. Telephony subsystem 104 is also connected to a telephone network 106. Telephone network 106 is connected, in turn to a telephone 108.

Computer network 100 includes a series of software processes. As shown in FIG. 3, these include media telephony speech (MTS) 302, VoiceXML interpreter 304 and one or more voice/audio applications 306.

MTS 302 is hosted by computer system 102e and interacts with telephony subsystem 104. MTS 302 provides one or more high-level interfaces to telephony subsystem 104, such as telephony, text-to-speech and speech recognition and prompt playing. Software processes in computer network 100 typically interact with telephony subsystem 104 through MTS 302.

VoiceXML interpreter 304 and voice/audio application 306 are hosted (together or separately) by one or more computer systems 102 in computer network 100. VoiceXML interpreter 304 sends requests to voice/audio application 306. Voice/audio application 306 sends VoiceXML responses to VoiceXML interpreter 304. VoiceXML interpreter 304 interprets the VoiceXML responses and forwards the interpreted results to MTS 302.

The combination of MTS 302, VoiceXML interpreter 304 and voice/audio application 306 provides an interactive voice interface for voice/audio application 306. Users access MTS 302 through telephone network 106 and telephony system 104. This access is bi-directional—users can both issue verbal/audio requests and receive verbal/audio responses. MTS passes user requests to VoiceXML interpreter 304 where they are translated into HTTP requests and passed to voice/audio application 306. Voice/audio application 306 responds to the HTTP requests with VoiceXML responses. Voice/audio application 306 sends these responses to VoiceXML interpreter 304 where they are translated into calls to MTS 302. MTS 302 passes these responses, in turn, to telephony system 104, telephone network 106 and, eventually, the user.

In general, it should be appreciated that the specific network of FIG. 1, computer system of FIG. 2, and software components of FIG. 3 are all intended to describe a representative environment for a VoiceXML interpreter. Other, equally suitable environments may include these or other components. The specific functions of each component may also vary between different environments. Additional details of the representative environment of FIGS. 1 through 3 are described in related U.S. Pat. No. 7,016,847 entitled "Open Architecture for a Voice User Interface." That disclosure is incorporated in this document by reference.

System for Embedding Programming Language Content in VoiceXML

Voice/audio application 306 uses a series of enhanced VoiceXML scripts. The enhanced VoiceXML scripts may include embedded elements of a high-level language. Voice/audio application 306 processes each script before sending it to VoiceXML interpreter 304 or in response to requests from VoiceXML interpreter 304. Voice/audio application 306 executes each high-level language (HLL) element as it is encountered during this processing.

As an example, consider the following VoiceXML fragment:

```
<vxml>
    <form>
        <block>You have email from <%=msg.getFrom( )%>, received at
        <%=msg.getDate( )%>. Subject is <%=msg.getSubject( )%>
        </block>
    </form>
</vxml>
```

During processing, voice/audio application 306 scans for the tokens "<%=" and "%>". Voice/audio application 306 treats text enclosed by these tokens as HLL expressions. Voice/audio application 306 evaluates (interprets) each HLL expression as it is encountered. Voice/audio application 306 replaces each HLL expression with its evaluated value.

After executing and replacing each HLL expression, the preceding fragment would have a form similar to:

```
<vxml>
    <form>
        <block>You have email from Joe Smith, received at 4 am.
        Subject is airplane delay
        </block>
    </form>
</vxml>
```

After processing, voice/audio application 306 sends the resulting script to VoiceXML interpreter 304. VoiceXML interpreter 304 then interprets the updated VoiceXML fragment.

The process of token recognition, HLL expression execution and HLL expression replacement can be adapted to a range of different languages. The examples used in this description focus on the use of the Java programming language and the use of Java Server Pages (JSP) in particular. Java and JSP have the advantage of being widely adopted within the Internet programming environment.

The definition for Java Server Pages includes a range of tokens and directives. These include:

| | |
|---|---|
| <%= Expression %> | Voice/audio application 306 evaluates expression and replaces it with the resulting value. |
| <% code %> | Voice/audio application 306 inserts code into the service method. |
| <%! Code %> | Voice/audio application 306 inserts code into the body of servlet class, outside of service method. |
| <%@ page att="val" %> | General setup directions for Voice/audio application 306. |

| | |
|---|---|
| <%@ include file="url" %> | Voice/audio application 306 includes the contents of the file identified by URL. |
| <%-- comment text --%> | Voice/audio application 306 ignores text between <%-- and --%>. |
| <jsp:useBean att=val /> | Voice/audio application 306 finds or builds a Java Bean. |
| <jsp:setProperty att="val" /> | Voice/audio application 306 sets bean properties. |
| <jsp:getProperty name="propertyName" value="val" /> | Voice/audio application 306 finds and outputs bean properties. |
| <jsp:forward page="URL" /> | Voice/audio application 306 forwards request to designated page. |
| <jsp:plugin attribute="val" /> | Voice/audio application 306 generates code to request that an applet be run using a Java plugin. |

Voice/audio application 306 can be configured to support all or a subset of these directives. The addition of Java Server Pages to VoiceXML provides a flexible framework for constructing voice applications. The efficiency of applications created with this framework can be greatly enhanced by creating VoiceXML scripts in a way that reduces interaction between VoiceXML interpreter 304 and voice/audio application 306. Each of the following examples has been selected with this consideration in mind. Code for the following examples is attached as Appendix A.

EXAMPLE ONE

```
<jsp:useBean id="random" class="com.genmagic.util.RandomPrompt">
    <jsp:setProperty name="random" property="addPrompt"
        value="hello_1.wav"/>
    <jsp:setProperty name="random" property="addPrompt"
        value="hello_2.wav"/>
    <jsp:setProperty name="random" property="addPrompt"
        value="hello_3.wav"/>
    ...
    <jsp:setProperty name="random" property="addPrompt"
        value="hello_29.wav"/>
    <jsp:setProperty name="random" property="addPrompt"
        value="hello_30.wav"/>
</jsp:useBean>
```

Execution of this fragment causes voice/audio application 306 to create a pool of audio files. In this case, thirty files are created but the same methods could be used with any number of files. This Java implementation for RandomPrompt subdivides the pool of files into segments. For this particular example, it may be assumed that six segments of five files are created.

VoiceXML scripts can generate code to select prompts from the prompt pool by including the expression:

```
<jsp:getProperty name="random" property="prompt"/>
```

During interpretation, voice/audio application 306 replaces the getProperty directive with VoiceXML of the form:

```
<var name="tmp" expr="Math.random( ) * 4"/>
<if cond="1.0>=tmp">
    <audio src="builtin:hello_5.wav"/>
<elseif cond="2.0>=tmp"/>
    <audio src="builtin:hello_6.wav"/>
<elseif cond="3.0>=tmp"/>
    <audio src="builtin:hello_7.wav"/>
<elseif cond="4.0>=tmp"/>
    <audio src="builtin:hello_8.wav"/>
<elseif cond="5.0>=tmp"/>
    <audio src="builtin:hello_9.wav"/>
</if>
```

Execution of this code causes VoiceXML interpreter 304 to randomly select an audio prompt from a segment within the pool of audio prompts. This segment of code can be executed multiple times with the prompt chosen varying between the five prompts included in the segment. Each re-execution is accomplished without further interaction between VoiceXML interpreter 304 and voice/audio application 306.

EXAMPLE TWO

```
<jsp:useBean id="shuffle" class="ShufflePrompt">
    <jsp:setProperty name="shuffle" property="addPrompt"
        value="hello_1.wav"/>
    <jsp:setProperty name="shuffle" property="addPrompt"
        value="hello_2.wav"/>
    <jsp:setProperty name="shuffle" property="addPrompt"
        value="hello_3.wav"/>
    ...
    <jsp:setProperty name="shuffle" property="addPrompt"
        value="hello_29.wav"/>
    <jsp:setProperty name="shuffle" property="addPrompt"
        value="hello_30.wav"/>
</jsp:useBean>
```

Execution of this fragment causes voice/audio application 306 to create a pool of audio files. In this case, thirty files are created but the same methods could be used with any number of files. This Java implementation for ShufflePrompt subdivides the pool of files into segments. For this particular example, it may be assumed that six segments of five files are created. Each segment includes a shuffled sequence of audio prompts. Thus, one segment might include audio prompts 29, 3, 15, 11 and 7. A second segment might include audio prompts 2, 24, 21, 7 and 19. Each segment is created without duplicate entries.

VoiceXML scripts can generate code to select prompts from the prompt pool by including the expression:

```
<jsp:getProperty name="shuffle"
    property="prompt"/>
```

During interpretation, voice/audio application 306 replaces the getProperty directive with VoiceXML of the form:

```
<var name="tmp" expr="tmp + 1"/>
<if cond="tmp == 6">
    <assign name="tmp" expr="1"/>
</if>
<if cond="1 == tmp">
    <audio src="builtin:hello__29.wav"/>
<elseif cond="2 == tmp">
    <audio src="builtin:hello__3.wav"/>
<elseif cond="3 == tmp">
    <audio src="builtin:hello__15.wav"/>
<elseif cond="4 == tmp">
    <audio src="builtin:hello__11.wav"/>
<elseif cond="5 == tmp">
    <audio src="builtin:hello__7.wav"/>
</if>
```

The expanded code implicitly selects one of the segments from the pool of audio prompts. The first execution of this code by VoiceXML interpreter 304 causes the first prompt in the selected segment to be played. Subsequent executions cause the remaining prompts to be played in order. Each re-execution is accomplished without further interaction between VoiceXML interpreter 304 and voice/audio application 306.

EXAMPLE THREE

```
<field name="next">
<field>
    <% if (mail.isLast( )) { %>
        <prompt> That was the last one </prompt>
    <% } else { %>
        <goto next="email.jsp#event=nextMail"/>
    <% } %>
</field>
```

This fragment is intended to be used to help an application (and user) navigate within a variable length list of audio prompts. Lists of this type are used in applications where the number of prompts is not fixed. An example might be a voice email application that uses different prompts for different items in a user's inbox. Since the number of inbox items changes, the list of prompts has no fixed length.

The VoiceXML fragment is configured so that VoiceXML interpreter 304 first tests to determine if the end of the list has been reached (i.e., there is no next item). Only if this condition is false, does the VoiceXML interpreter 304 retrieve the next item from voice/audio application 306. This avoids interaction between VoiceXML interpreter 304 and voice/audio application 306 if there is no next item.

EXAMPLE FOUR

This example applies to user interfaces that support multiple domains. User interfaces of this type are intended to allow users to perform multiple unrelated tasks, such as reading email, listening to news and performing stock transactions. This type of application works best where the user is able to move randomly between domains (i.e., there is no preset order required).

In applications of this type, VoiceXML scripts do not know the identity of the next domain to be visited. This information can be generated by adding the expression:

```
<goto next="domain.jsp#event=nextDomain"/>
```

The following VoiceXML fragment can be used to generate different prompts for multiple domain user interfaces. The fragment causes VoiceXML interpreter 304 to generate an initial prompt for a user's first visit to a domain. A secondary prompt is used for each subsequent visit.

```
<% if (domain.isCurrentDomainVisited( ) == false) { %>
<prompt>You have 3 new messages and old messages </prompt>
<% } else { %>
<prompt>You returned back to email. </prompt>
<% } %>
```

EXAMPLE FIVE

This example applies to systems that support multiple services (i.e., multiple voice/audio applications 306). Systems of this type work best if VoiceXML interpreter 304 performs initial routing for each incoming call. To perform this type of routing, a VoiceXML fragment of the following type may be used.

```
<% if (DNIS.startsWith("800123")) { %>
    <goto next="http://banking.genmagic.com/bankingService.jsp"/>
<% } else if (ANI.equals("4087744485")) { %>
    <goto next="http://my.genmagic.com/oshima.jsp"/>
<% } %>
```

This fragment causes VoiceXML interpreter 304 to examine information about incoming calls. This information may include Direct Number Identification (DNIS), Automatic Number Identification (ANI) and User to User Identification (UUI) information. In each case, the information can be used to direct incoming calls to one or more voice/audio application 306.

```
<jsp:useBean id="router" class="com.genmagic.util.Router"/>
<jsp:setProperty name="router" property="dnis" param="dnis"/>
<jsp:setProperty name="router" property="ani" param="ani"/>
<jsp:setProperty name="router" property="uui" param="uui"/>
<% if (router.isServiceFor("onstar")) { %>
    <goto next="http://onstar.genmagic.com/login.jsp"/>
<% } else if (router.isServiceFor("bank")) { %>
    <goto next="http://banking.genmagic.com/bankingService.jsp"/>
<% } %>
```

CONCLUSION

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

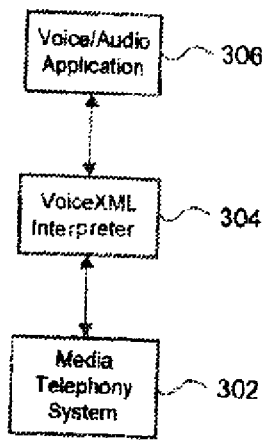

What is claimed is:

1. A method comprising:
processing, by one or more computing devices, a script composed in accordance with a language for scripting interactive voice response services and having embedded therein an element of a high-level programming language, wherein processing the script comprises executing the element of the high-level programming language to dynamically generate a script fragment comprising a subroutine composed in accordance with the language for scripting interactive voice response services and replacing the element of the high-level programming language with the generated script fragment to provide a processed script; and interpreting the processed script to generate a voice response, comprising interpreting the generated script fragment in accordance with the language for scripting interactive voice response services.

2. The method of claim 1, wherein the language for scripting interactive voice response services is Voice Extensible Markup Language (VoiceXML).

3. The method of claim 1, wherein the element of the high-level programming language comprises a Java programming language element.

4. The method of claim 1, wherein the element of the high-level programming language comprises a Java Server Page.

5. The method of claim 1, further comprising:
receiving a voice request from a user;
translating the voice request into a translated request formatted in accordance with a protocol for transferring information over a network; and
processing the translated request;
wherein the step of selecting the script is performed in response to the processing of the translated request.

6. The method of claim 5, wherein the protocol for transferring information over a network is the Hypertext Transfer Protocol (HTTP).

7. The method of claim 1 wherein the language for scripting interactive voice response services is a markup language.

8. A system, comprising:
one or more computer systems;
an application program configured for execution by the one or more computer systems to select and process a script composed in accordance with a language for scripting interactive voice response services and having embedded therein an element of a high-level programming language, wherein processing the script comprises executing the element of the high-level programming language to dynamically generate a script fragment comprising a subroutine composed in accordance with the language for scripting interactive voice services and replacing the element of the high-level programming language with the generated script fragment to generate processed script; and
an interpreter configured for execution by the one or more computer systems to interpret the processed script to generate a voice response,
wherein the application program and the interpreter are each independently hosted on at least one of the one or more computer systems.

9. The system of claim 8, wherein the language for scripting interactive voice response, services is Voice Extensible Markup Language (VoiceXML).

10. The system of claim 8, wherein the element of the high-level programming language comprises a Java programming language element.

11. The system of claim 8, wherein the element of the high-level programming language comprises a Java Server Page.

12. The system of claim 8, further comprising:
a media telephony system configured the execution by the one or more computer systems to receive a voice request from a user;
wherein the interpreter is further configured for execution by the one or more computer systems to translate the voice request into a translated request formatted in accordance with a protocol for transferring information over a network,
wherein the application program is further configured for execution by the one or more computer systems to process the translated request and to select the script in response to the processing of the translated request, and
wherein the media telephony system is hosted on at least one of the one or more computer systems.

13. The system of claim 12, wherein the protocol for transferring information over a network is the Hypertext Transfer Protocol (HTTP).

14. The system of claim 8, wherein the interpreter is adapted to interpret the generated script fragment.

15. The system of claim 8, wherein the language for scripting interactive voice response services is a markup language.

16. The system of claim 8, wherein the one or more computer systems hosting the application program comprises a computer system of the one or more computer systems hosting the interpreter.

17. The system of claim 12, wherein the one or more computer systems hosting the media telephony system comprises a computer system of the one or more computer systems hosting the interpreter or the one or more computer systems hosting the application program.

18. A computer-readable medium having stored thereon, computer-executable instructions that are configured to be executed by computing device to cause the computing device to perform a method comprising:
selecting a script composed in accordance with a language for scripting interactive voice response services and having embedded therein an element of a high-level programming language;
processing the script, wherein processing the script comprises executing the element of the high-level programming language to dynamically generate a script fragment comprising a subroutine composed in accordance with the language for scripting interactive voice response services and replacing the element of the high-level programming language with the generated script fragment to provide a processed script; and
interpreting the processed script to generate a voice response.

19. The computer-readable medium of claim 18, wherein the language for scripting interactive voice response services is Voice Extensible Markup Language (VoiceXML).

20. The computer-readable medium of claim 18, wherein the element of the high-level programming language comprises a Java programming language element.

21. The computer-readable medium of claim 18, wherein the element of the high-level programming language comprises a Java Server Page.

22. The computer-readable medium of claim 18, wherein the method further comprises:
receiving a voice request from a user;
translating the voice request into a translated request formatted in accordance with a protocol for transferring information over a network; and
processing the translated request;
wherein the step of selecting the script is performed in response to the processing of the translated request.

23. The computer-readable medium of claim 22, wherein the protocol for transferring information over a network is the Hypertext Transfer Protocol (HTTP).

24. The computer-readable medium of claim 18, wherein the language for scripting interactive voice response services is as markup language.

25. A system comprising:
- one or more processors configured to process instructions stored on a memory;
- means for processing, by the one or more processors, a script composed in accordance with a language for scripting interactive voice response services and having embedded therein an element of a high-level programming language, wherein processing the script comprises executing the element of the high-level programming language to dynamically generate a script fragment comprising a subroutine composed in accordance with the language for scripting interactive voice response services and replacing the element of the high-level programming language with the generated script fragment to provide a processed script; and
- means for interpreting, by the one or more processors, the processed script to generate a voice response, comprising interpreting the generated script fragment in accordance with the language for scripting interactive voice response services.

\* \* \* \* \*

UNITED STATES PATENT AND TRADEMARK OFFICE
CERTIFICATE OF CORRECTION

PATENT NO. : 8,494,139 B2
APPLICATION NO. : 11/511211
DATED : July 23, 2013
INVENTOR(S) : Byrne et al.

Page 1 of 2

It is certified that error appears in the above-identified patent and that said Letters Patent is hereby corrected as shown below:

The title page should be deleted and substitute therefor the attached title page.

On the Title Page, in the Figure, for Tag "304", in Line 2, delete "Intepreter" and insert -- Interpreter --, therefor.

In the Drawings

In Fig. 3, Sheet 1 of 2, for Tag "304", in Line 2, delete "Intepreter" and insert -- Interpreter --, therefor.

In the Specifications

In Column 1, Line 52, delete "World!"" and insert -- World!". --, therefor.

In the Claims

In Column 9, Line 32, in Claim 7, delete "claim 1" and insert -- claim 1, --, therefor.

In Column 9, Lines 47-48, in Claim 8, delete "generate processed" and insert -- generate a processed --, therefor.

In Column 9, Line 56, in Claim 9, delete "response," and insert -- response --, therefor.

In Column 10, Line 31, in Claim 18, delete "by" and insert -- by a --, therefor.

In Column 11, Line 3, in Claim 24, delete "as" and insert -- a --, therefor.

Signed and Sealed this
Twenty-ninth Day of April, 2014

Michelle K. Lee
*Deputy Director of the United States Patent and Trademark Office*

CERTIFICATE OF CORRECTION (continued)

(12) United States Patent
Byrne et al.

(10) Patent No.: US 8,494,139 B2
(45) Date of Patent: ***Jul. 23, 2013

(54) SYSTEM FOR EMBEDDING PROGRAMMING LANGUAGE CONTENT IN XML

(75) Inventors: William J. Byrne, Sunnyvale, CA (US); Mitsuru Oshima, Cupertino, CA (US); Michael Achenbach, Los Altos, CA (US); Beth A. Bottos, San Jose, CA (US); Dai Zhu, San Jose, CA (US)

(73) Assignee: Intellectual Ventures I LLC, Wilmington, DC (US)

( * ) Notice: Subject to any disclaimer, the term of this patent is extended or adjusted under 35 U.S.C. 154(b) by 1511 days.

This patent is subject to a terminal disclaimer.

(21) Appl. No.: 11/511,211

(22) Filed: Aug. 29, 2006

(65) Prior Publication Data

US 2007/0116202 A1  May 24, 2007

Related U.S. Application Data

(63) Continuation of application No. 09/733,848, filed on Dec. 8, 2000, now Pat. No. 7,170,979.

(51) Int. Cl.
*H04M 3/42* (2006.01)

(52) U.S. Cl.
USPC .................. 379/201.03; 379/88.18

(58) Field of Classification Search
USPC ......................... 379/201.03, 88.18
See application file for complete search history.

(56) References Cited

U.S. PATENT DOCUMENTS

| | | | |
|---|---|---|---|
| 5,309,413 A * | 5/1994 | Chan | 368/63 |
| 5,864,605 A | 1/1999 | Keshav | |
| 5,943,401 A | 8/1999 | Risner et al. | |
| 6,144,938 A | 11/2000 | Surace et al | |
| 6,240,391 B1 | 5/2001 | Ball et al. | |
| 6,263,051 B1 | 7/2001 | Saylor et al | |
| 6,269,336 B1 | 7/2001 | Ladd et al | |
| 6,363,411 B1 | 3/2002 | Dugan et al. | |
| 6,385,583 B1 | 5/2002 | Ladd et al. | |
| 6,463,461 B1 | 10/2002 | Hanson et al. | |
| 6,490,564 B1 | 12/2002 | Dodrill et al. | |
| 6,496,812 B1 | 12/2002 | Campaigne et al | |
| 6,510,417 B1 | 1/2003 | Woods et al. | |
| 6,569,207 B1 | 5/2003 | Sundaresan | |
| 6,768,788 B1 | 7/2004 | Langseth et al. | |
| 7,016,847 B1 | 3/2006 | Tessel et al. | |
| 7,487,440 B2 * | 2/2009 | Gergic et al. | 715/234 |
| 2002/0010736 A1 | 1/2002 | Marques et al. | |
| 2002/0019828 A1 | 2/2002 | Mortl | |
| 2002/0198719 A1 | 12/2002 | Gergic et al. | |

OTHER PUBLICATIONS

Voice eXtensible Markup Language, VoiceXML Version 1.00, Mar. 7, 2000, by VoiceXML Forum.

Maes, S, Modular DOM Based Multi-modal Browser Architecture Recommendation for Mobile e-Business and evolution to Conversational Computing, IBM T.J. Watson Center, pp. 1-45, Nov. 2000.

* cited by examiner

*Primary Examiner* — Simon Sing
(74) *Attorney, Agent, or Firm* — Sterne, Kessler, Goldstein & Fox P.L.L.C.

(57) ABSTRACT

A method for providing an interactive voice response service is provided. The method uses a VoiceXML interpreter in cooperation with a voice/audio application. The voice/audio application uses scripts coded in VoiceXML with embedded Java Server Pages (JSP). The use of VoiceXML along with JSP allows the present invention to provide an implementation that minimizes interaction between the voice/audio application and the VoiceXML server.

25 Claims, 2 Drawing Sheets